(12) United States Patent
Gehwolf et al.

(10) Patent No.: US 10,376,828 B2
(45) Date of Patent: Aug. 13, 2019

(54) APPARATUS AND METHOD FOR PRODUCING A BELLOWS

(71) Applicant: Mann+Hummel GMBH, Ludwigsburg (DE)

(72) Inventors: Klaus Gehwolf, Mamming (DE);
Tobias Tandetzki, Vilsbiburg (DE);
Josef Rohrmeier, Laberweinting (DE);
Gelase Mbadinga Mouanda, Laval (FR); Michael Wank, Coburg (DE);
Gerhard Weindl, Steinberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 495 days.

(21) Appl. No.: 15/078,859

(22) Filed: Mar. 23, 2016

(65) Prior Publication Data

US 2016/0236133 A1 Aug. 18, 2016

Related U.S. Application Data

(63) Continuation of application No. PCT/EP2014/070165, filed on Sep. 23, 2014.

(30) Foreign Application Priority Data

Sep. 23, 2013 (DE) .................. 10 2013 015 645

(51) Int. Cl.
*B01D 46/52* (2006.01)
*B01D 46/00* (2006.01)
(Continued)

(52) U.S. Cl.
CPC ....... *B01D 46/522* (2013.01); *B01D 46/0001* (2013.01); *B01D 46/523* (2013.01); *B31D 5/0082* (2013.01); *B31D 5/04* (2013.01)

(58) Field of Classification Search
CPC .... B31D 5/0082; B31D 5/04; B01D 46/0001; B01D 46/522; B01D 46/523
(Continued)

(56) References Cited

U.S. PATENT DOCUMENTS 2,801,671 A * 8/1957 Vaughn .................. G21K 1/025
156/204
3,514,364 A 5/1970 Yamaguchi
(Continued)

FOREIGN PATENT DOCUMENTS

DE 19846916 A1 3/2000

*Primary Examiner* — Andrew M Tecco
*Assistant Examiner* — Nicholas Igbokwe
(74) *Attorney, Agent, or Firm* — James Hasselbeck

(57) ABSTRACT

A device for producing a bellows from a filter medium, including: an embossing device embossing fold lines into a filter medium that runs through the embossing device, producing an embossed filter medium for folding into a folded filter medium; the folded section of the filter medium being delimited by two adjacent fold lines; an adhesive application device applying adhesive onto the embossed filter medium; and a folding device folding, in a zig-zag manner, the embossed filter medium onto which the adhesive was applied into the folded filter medium; wherein the folding device includes a plurality of adjacent supporting elements that can be moved into or out of a folding space of the folding device; wherein the supporting elements are movable into the folding space such, that at least one folded section of the folded filter medium is contacted and supported by a respective one of the plurality of supporting element.

15 Claims, 8 Drawing Sheets

(51) Int. Cl.
*B31D 5/00* (2017.01)
*B31D 5/04* (2017.01)

(58) Field of Classification Search
USPC ....... 493/430, 433, 448, 451, 459, 131, 940, 493/947, 463
See application file for complete search history.

(56) References Cited

U.S. PATENT DOCUMENTS

| | | | | |
|---|---|---|---|---|
| 3,857,144 | A | * | 12/1974 | Bustin ................... B29C 59/046 156/199 |
| 4,201,119 | A | * | 5/1980 | Wolf .................. B01D 46/0001 156/204 |
| 4,288,278 | A | * | 9/1981 | Akao ................. B01D 46/0001 156/204 |
| 4,798,575 | A | | 1/1989 | Siversson |
| 5,120,296 | A | | 6/1992 | Yamaguchi |
| 5,316,819 | A | * | 5/1994 | Nemoto ................... G12B 1/04 29/454 |
| 5,389,175 | A | | 2/1995 | Wenz |
| 6,022,305 | A | | 2/2000 | Choi et al. |
| 6,165,242 | A | | 12/2000 | Choi |
| 6,290,635 | B1 | * | 9/2001 | Demmel ............ B01D 46/0001 156/73.1 |
| 2013/0008849 | A1 | * | 1/2013 | Gehwolf ............ B01D 46/0001 210/493.5 |
| 2015/0007732 | A1 | | 1/2015 | Hasenfratz et al. |

\* cited by examiner

APPARATUS AND METHOD FOR PRODUCING A BELLOWS

TECHNICAL FIELD

The present invention relates to a device and to a method for producing a bellows.

Filters are used, for instance, in supplying air for internal combustion engines to clean the air supplied for combustion of impurities and particles of dirt so that only cleaned air is supplied to a combustion process in the internal combustion engine. Moreover, filters are used, e.g. in air conditioning, for filtering the supply air for buildings or even for motor vehicle interiors. In addition to air and gas filtration, filters are also used for cleaning liquids, such as oil and fuel.

In general, a filter has an inflow opening for uncleaned raw fluid and an outflow opening for the filtered clean fluid and a filter element, wherein the filter element fulfills the actual filtering function. The fluid is supplied to an internal combustion engine, a vehicle interior, or the interior of a building, etc., via an outflow opening of the filter. The filter element may include a filter medium through which flows the fluid to be filtered so that the dirt particles are separated from the fluid flowing through in the filter medium.

The filter medium may be folded in a zigzag manner in the shape of a bellows to enlarge the surface area of the filter. Enlarging the surface area can prolong the service life of the filter element, since a larger surface area can capture more particles of dirt before the loss of pressure caused by the separated particles becomes too great or has increased to the point that the fluid can no longer pass or flow through the filter medium. The quantity of particles captured up to this point determines the so-called capacity of the filter element, and as a rule the larger the capacity, the more filter medium or filtering filter medium surface area is present in a filter element.

Normally the filter element is arranged in a housing. The structural design of the housing must be adapted to external characteristics, e.g. the spaces in the engine compartment of a motor vehicle. As a rule, the structural configuration of the housing influences the shape and size of the filter element.

In order to be able to house as much filter medium with a filtering surface area as possible in the installation space available, the filter medium is folded, for instance in a zig-zag manner.

BACKGROUND OF THE INVENTION

EP 0 953 372 A1 describes an apparatus for forming bellows with a filter medium folded in a zig-zag manner. The apparatus has an embossing device with two opposing embossing rollers for embossing fold lines into the filter medium and a folding device with two opposing positioning rollers. The apparatus is suitable in particular for producing bellows with variable fold heights. To this end the embossing rollers may be rotated at a variable rotational speed.

US76615408 B2 also describes an apparatus for producing bellows with a filter medium folded in a zig-zag manner, which apparatus includes an embossing device for embossing fold lines into the filter medium and a folding device, not described in greater detail. An adhesive application device for applying adhesive to the embossed filter medium is provided between the embossing device and the folding device.

SUMMARY OF THE INVENTION

Given this background, the underlying object of the invention is to provide an improved device and an improved method for producing a bellows, especially in a continuous mass production process.

One embodiment of a device for producing a bellows from a filter medium includes at least one of the following devices: an embossing device, an adhesive application device, and/or a folding device.

An embossing device may include two opposing embossing shafts. The filter medium is fed to the guide rollers horizontally or vertically. Each embossing shaft may have a plurality of blades. A fold line interval may be set as desired by varying a rotational speed of the embossing shafts. The fold line interval determines the fold height of the bellows, wherein a folded section of the medium is limited by two adjacent fold lines. The rotational speed of the embossing shafts may be set by a drive device of the embossing device. The drive device may be an electric motor. The fold line interval may furthermore be set in that a conveyance speed of the filter medium is varied. The fold height is defined as a distance from the one envelope end of the bellows to any fold edge of a filter fold of the bellows.

The adhesive application device may have a plurality of opposing adhesive nozzles that are designed to apply an adhesive, especially a hot melt adhesive, to both sides of the filter medium.

The folding device may have a plurality of adjacent supporting elements that may optionally be moved into or out of a folding space of the folding device. The supporting elements are embodied such, and are movable into the folding space such, that at least one folded section of the folded filter medium may be supported by the respective supporting element. The folding device is especially designed to move the supporting elements that have been moved into the folding space in a direction of conveyance of the filter medium along with the folded filter medium.

Because the folded filter medium is supported by supporting elements for a period after the folding process, the adhesive may at least partially cure in the shape of the bellows stabilized by the supporting elements. In particular the bellows is stabilized by the supporting elements until the adhesive is dimensionally stable. If the supporting elements are then later moved out of the folding space or out of the folded slots of the bellows, the desired shape of the bellows is retained. The adhesive is especially arranged to support and position the folded sections. The adhesive thus provides dimensional stability for the bellows. Consequently bellows having high dimensional accuracy may be produced in a continuous mass production process by means of the inventive device.

In the case of relatively tall or deep installation spaces, it may then be necessary for the filter element to have relatively tall folds. The fold height is defined as a distance from one envelope end of the filter element to a respective fold edge of a filter fold of the filter element. In addition, the smaller the fold interval is, the more folded filter medium may be housed in a given installation space. Especially in such a bellows having high and narrow folds, the dimensional accuracy of the bellows is particularly significant due to the especially narrow and deep folded slots. If the folded sections bend in an undesired manner, this may lead to narrowings in the folded slots, and in the extreme case may even cause folded slots to close due to being positioned against opposing folded sections. A folded slot of a filter fold is preferably delimited on both sides by a folded section. The formation of undesired bends is prevented or at least reduced thanks to the support of the bellows while the applied adhesive is curing.

A folding device for folding the filter medium may have two mutually opposing die packets or supporting element packets. Each supporting element packet preferably has a plurality of dies or supporting elements that are arranged adjacent to one another, especially above one another. The supporting elements are preferably set up to engage alternatingly in one another.

There may be any number of supporting elements. For instance, one supporting element packet may have 70 supporting elements. The supporting element packets may have the same number of supporting elements or different numbers of supporting elements. The supporting elements of the supporting element packets may in particular be laterally or vertically alternatingly movable into or out of a folding space of the folding device.

The folding device is in particular set up to move the supporting elements in the direction of conveyance of the filter medium along with the folded filter medium, to move the supporting elements therefrom at a first or lower position of the folding space, to move the supporting elements opposing the direction of conveyance of the filter medium in a second or upper position of the folding space, and to move them back into said folding space.

The device may furthermore include a positioning device for positioning the folded sections for forming the filter folds. In particular the folding device may include the positioning device. The positioning device may include two positioning rollers upstream of the supporting elements in the direction of conveyance of the filter medium.

The device may furthermore have a separating device for separating the bellows from the filter medium. The separating device may be a knife or blade. It is also possible to cut through the fold using a laser cutting method.

One embodiment is, e.g., a device for producing a bellows from a filter medium with an embossing device for embossing fold lines into the filter medium that runs through the embossing device, a folded section of the filter medium being delimited by two adjacent fold lines, an adhesive application device for applying an adhesive to the embossed filter medium, and a folding device for folding, in a zig-zag manner, the embossed filter medium to which the adhesive was applied, wherein the folding device has a plurality of adjacent supporting elements that can optionally be moved into or out of a folding space of the folding device, wherein the supporting elements are designed such, and are movable into the folding space such, that at least one folded section of the folded filter medium can be supported by the respective supporting element, and wherein the folding device is designed such as to move the supporting elements that have been moved into the folding space in a direction of conveyance of the filter medium along with the folded filter medium.

In this case, folding may also be construed to mean bending, especially wave-like bending. Zig-zag manner may also be construed to mean accordion-like.

The filter medium preferably has a machine direction. The machine direction is the name for the production direction of a machine for producing the filter medium. During machine production of the filter medium, fibers of the filter medium are oriented more or less strongly in the machine direction. This causes different characteristics of a few mechanical properties (e.g. strength, extensibility, stiffness) of the filter medium in the machine direction compared to the transverse direction. The fiber direction is preferably parallel to a long side of a curve of the filter medium. The filter medium is preferably 2-dimensional, in particular curved. The machine direction can coincide with the direction of conveyance. The filter medium is in particular linear.

The filter medium is supplied to the device especially using a feed device. A conveyance speed of the filter medium may be variable or constant. For instance, if the conveyance speed is increased, the fold density, i.e. the number of folds per unit of volume of the bellows, may be increased. Furthermore, the increase in the conveyance speed may result in an increased fold height.

In embodiments of the device, the at least one folded section of the folded filter medium may be supported by the specific supporting element until the adhesive is dimensionally stable.

Supporting the bellows while the applied adhesive cures prevents or at least reduces the formation of undesired bends. Dimensionally stable in this case shall be construed to mean that the adhesive cures until the bellows may be handled without the adhesive deforming. The adhesive in particular supports and positions the folded sections.

In further embodiments of the device, the folding device is designed to move the supporting elements in the direction of conveyance of the filter medium along with the folded filter medium, to move the supporting elements out of the folding space at a first or lower position of the folding space, to move the supporting elements opposing the direction of conveyance of the filter medium into a second or upper position of the folding space, and to move them back into this folding space such that any folded section of the folded filter medium is always supported across its entire length.

By moving a supporting element into the folding space, the folded section is preferably always supported across its entire length. The supporting element is preferably moved along with the folded section from the upper or second position of the folding space into the lower or first position. In the lower or first position, the supporting element is moved between two folded sections or out of the folded slot and to the upper or second position. The supporting elements of the supporting element packet are especially alternatingly moved into or out of the folding space.

In other embodiments of the device, the embossing device has two opposing embossing shafts, wherein the embossing device is designed to rotate the embossing shafts at a variable rotational speed.

The embossing shafts preferably have a plurality of circumferentially arranged embossing knives or embossing edges. There may be any number of embossing edges.

In other embodiments of the device, for producing a bellows having folds with different heights, the folding device has supporting elements of different heights, wherein a height of the supporting element corresponds to the height of the folded slots of the folded filter medium.

In other embodiments, for producing a bellows having folds with different heights, the folding device has supporting elements, wherein the supporting elements may be moved a different distance into or out of the folding space.

The height of length of the supporting elements corresponds to the height or depth of the folded slots into which that specific supporting element is moved. Thus, optimum support is provided in each folded slot during the production of a bellows having folds of different heights. The supporting elements are in particular exchangeable in order to be able to produce different bellows having a different course of fold heights.

Alternatively, or in addition, the folding device may also be designed such that the supporting elements may be moved a different distance into or out of the folding space depending on the fold height. The need for changing the supporting elements for producing different bellows is then eliminated or at least reduced.

In other embodiments of the device, the adhesive application device is designed to apply tapered beads of adhesive onto the filter medium and/or to apply adhesive to both sides of the filter medium, especially to apply adhesive to both sides of the filter medium simultaneously.

Compared to adhesive application to one side, this prevents the filter medium from swinging. Applying the adhesive to both sides leads to maintaining the pulse during application. The adhesive is in particular a glue fillet, i.e. the term glue fillet may be substituted by the term adhesive and vice versa. The adhesive or glue may be a hot melt adhesive or hot glue. The tapered glue fillets, especially in the hardened state, define a distance between filter folds of the bellows. The adhesive may also be applied in dots. In this case tapered shall be construed to mean that a thickness of the glue fillet tapers towards an inner fold edge of a filter fold. The adhesive application device may be positioned such that the filter medium passes through the adhesive application device horizontally. Alternatively, the adhesive may also be applied to a vertically running filter medium. This prevents the adhesive from dripping from the filter medium.

In other embodiments of the device, the supporting elements have recesses for the adhesive applied to the filter medium.

The supporting elements are in particularly embodied in a comb shape, wherein the adhesive may be arranged between the teeth of the comb shape. This can prevent contamination and/or gluing of the supporting elements. The supporting elements are produced for instance from a metal material. The supporting elements may also be produced from a fiber-reinforced plastic, especially a carbon fiber-reinforced plastic.

In other embodiments of the device, the supporting elements have tapered outer contour corresponding to the fold geometry of the bellows.

Different supporting elements may be provided for different fold geometries. Alternatively, the supporting elements may have a rectangular geometry.

In other embodiments of the device, the supporting elements are arranged opposing one another, wherein the supporting elements are alternatingly movable into and out of the folding space of the folding device.

Preferably two supporting element packets arranged opposing one another are provided that each have a plurality of supporting elements. The supporting elements are preferably designed to engage in one another alternatingly.

In accordance with a method aspect of the invention, a method for producing a bellows from a filter medium has the following method steps: embossing fold lines into the filter medium, wherein one folded section of the filter medium is delimited by two adjacent fold lines, applying adhesive to the embossed filter medium and folding, in a zig-zag manner, the embossed filter medium that has been provided with adhesive, wherein the folded sections, after the folding of the filter medium, are supported across their entire length by means of supporting elements arranged in formed folded slots of the filter medium and moved in a direction of conveyance of the filter medium along with the folded filter medium.

In embodiments of the method, the filter medium is folded using a folding device, wherein the folding device has at least one supporting element packet with a plurality of adjacent supporting elements, wherein the supporting elements may optionally be moved into or out of the folding space of the folding device, wherein each supporting element is moved into the folding space until a folded section of the folded filter medium is supported by the respective supporting element, and wherein the folding device moves the supporting elements along with the folded filter medium in a direction of conveyance of the filter medium, moves the supporting elements out of the folding space at a lower or first position thereof, moves the supporting elements in opposition to the direction of conveyance of the filter medium to an upper or second position of the folding space, and moves them back into the folding space.

In embodiments of the method, a desired fold line interval is provided in that the fold lines are embossed with two opposing embossing shafts of an embossing device, wherein the embossing shafts rotate at a variable rotational speed.

This makes it possible to rapidly adjust different fold heights of the bellows. In particular, because of this it is possible to realize different fold heights within one bellows. This achieves great flexibility during production of bellows.

In other embodiments of the method, after the folding of the filter medium, the folded sections are supported by means of supporting elements projecting different distances into the folding space.

This always provides support of the filter folds across their entire fold height, even with variable fold heights. This makes it possible to produce bellows with great precision.

In other embodiments of the method, a conveyance speed of the filter medium is varied, preferably such that during production of a bellows having different fold heights the number of folds produced per unit of time is constant for the bellows.

For instance, the number of folds produced per unit of time may be determined as the number of folds produced per second or minute. Alternatively, the conveyance speed may be constant. For instance, when the conveyance speed is increased, the fold density, i.e. the number of folds per unit of volume of the bellows, may be increased. Furthermore, an increase in the conveyance speed may result in an increased fold height.

In other embodiments of the method, the supporting elements remain in the folded slots of the filter medium until the adhesive is dimensionally stable.

In particular the supporting elements remain in the folded slots until the adhesive has cured. This makes it possible to produce support of the finished filter folds until the bellows has dimensional stability and until the adhesive has cured. This means the bellows can be produced with great precision.

In other embodiments of the method, the adhesive is applied such that the thickness of the adhesive varies perpendicular to the fold lines.

This causes the adhesive to adapt to the folds. The adhesive may be applied in a tapered shape. In this case, in a tapered shape shall be construed to mean that a thickness of the adhesive bead decreases towards an inner fold edge of a filter fold.

In other embodiments of the method, the adhesive is applied in beads and/or on both sides of the filter medium. Alternatively, the adhesive is applied in dots. Applying the adhesive to both sides can prevent the filter medium from swinging when the adhesive is applied.

Other possible implementations of the invention include combinations, even those not explicitly cited, of features or method steps of exemplary embodiments described in the foregoing or in the following. A person skilled in the art will also add individual aspects as improvements or additions to the basic form of the invention.

Other embodiments of the invention are the subject-matter of the subordinate claims and the exemplary embodiments of the invention described in the following. The invention is explained in greater detail using exemplary embodiments, referencing the attached figures, in the following.

BRIEF DESCRIPTION OF THE DRAWINGS

Provided there is no information to the contrary, in the figures identical elements or elements having the same functions have been provided the same reference numbers.

DESCRIPTION OF THE INVENTION

Figure 1:
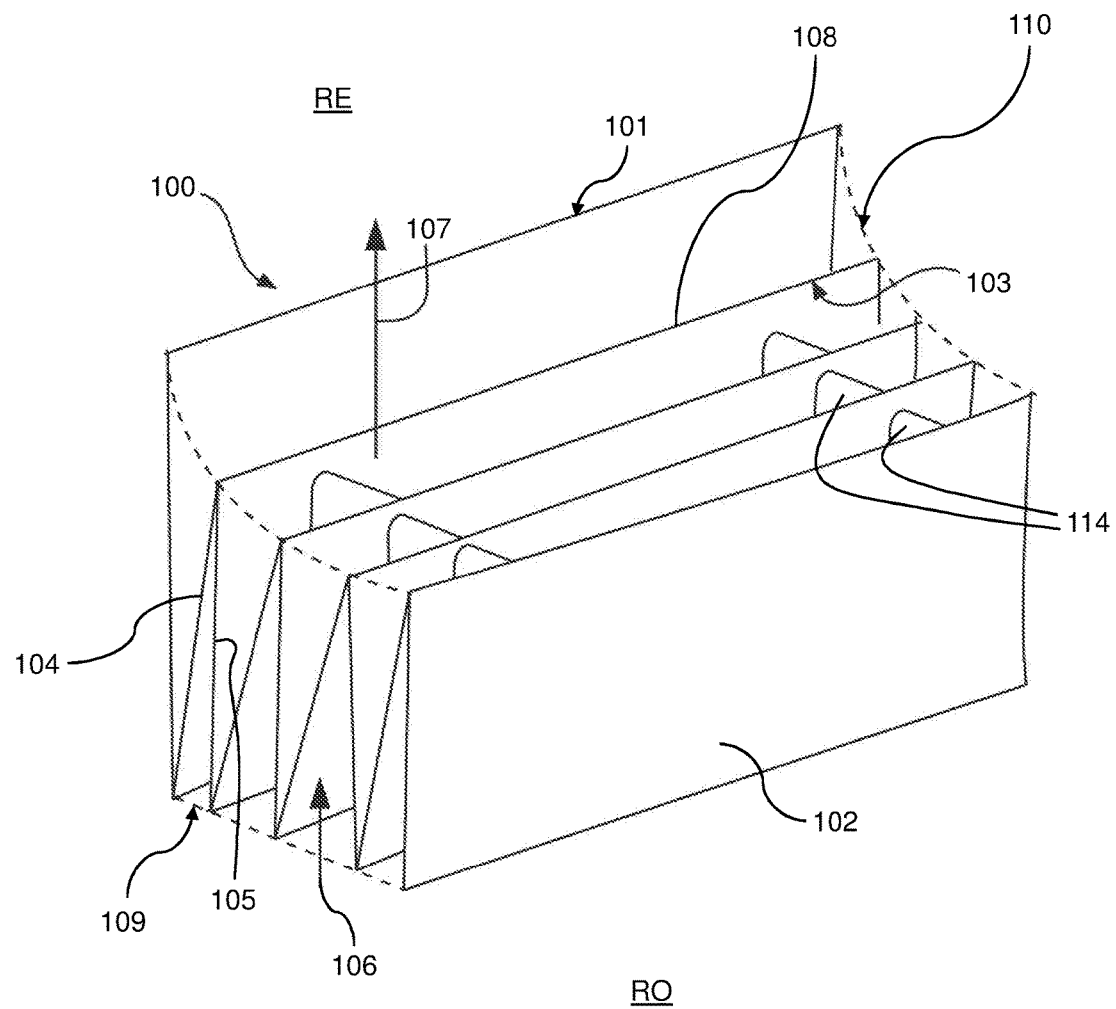
FIG. 1 is a schematic perspective elevation of one embodiment of a filter element.
Figure 2:
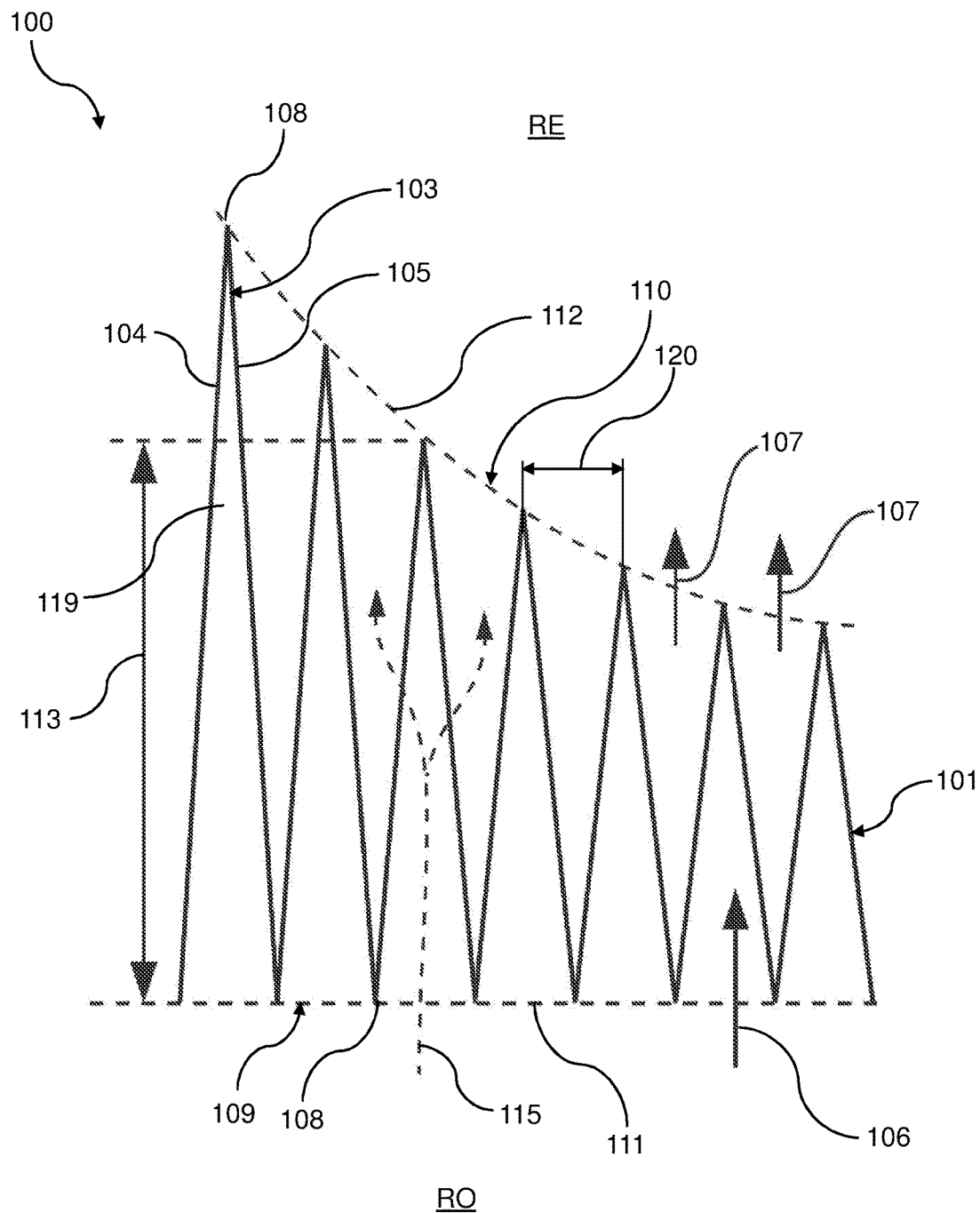
FIG. 2 is a schematic side view of the embodiment of the filtered element in accordance with FIG. 1.

FIG. 1 is a schematic perspective elevation of a filter element 100. FIG. 2 is a schematic side view of the filter element 100. The filter element 100 is in particular an air filter element. The filter element 100 has a filter medium 102 folded to create a bellows 101. In addition to the bellows 101, the filter element 100 may also have sidebands and/or headbands that can enclose the bellows 101 in a frame-like manner. The filter medium 102 may be produced from a non-woven or cellulose material. In particular the filter medium has a thickness of 0.4 to 2 millimeters and is embodied flat or curved. The filter medium 102 may be treated, for instance it may be impregnated or surface-treated.

The bellows 101 has a plurality of filter folds 103, wherein each filter fold 103 is formed by a first fold leaf or first folded section 104 and a second fold leaf or second folded section 105. Each filter fold 103 forms a filter slot 119 that is laterally delimited by the folded sections 104, 105 in the orientation in FIG. 2. The filter folds 103 or the first folded sections 104 and the second folded sections 105 extend in one direction from an inflow direction 106 to an outflow direction 107, or vice versa. A fold edge 108 of each filter fold 103 runs perpendicular to the inflow direction 106 or outflow direction 107. The fold edge 108 separates the folded sections 104, 105 from one another. The fold edge 108 represents the transition from the first folded section 104 to the second folded section 105 and is formed both at an inflow surface 109 and at an outflow surface 110 of the filter element 100.

The filtering effect of the bellows 101 is attained in that a filter medium 102 is used to form the filter folds 103, wherein uncleaned fluid, for instance, uncleaned air, so-called raw fluid RO, flows in the inflow direction 106 to the inflow surface 109 and flows through the filter medium 102 in the outflow direction 107 towards the outflow surface 110 and in doing so is cleaned so that clean fluid, in particular clean air RE, is on the outflow surface 110.

The fold edges 108 of all filter folds 103 on the inflow surface 109 and on the outflow surface 110 form so-called envelope ends 111 and 112, respectively, wherein the one envelope end 111, 112 may be an enveloping surface of the fold edges 108 on the inflow surface 109 or on the outflow surface 110. The fold edges 108 also span the inflow surface 109 and the outflow surface 110.

The envelope ends 111, 112 are connecting lines connecting the fold edges 108 at the outflow surface 110 or at the inflow surface 109, wherein the connecting line runs perpendicular to the fold edges 108 and the connecting line in particular with the outflow surface 110 or with the inflow surface 109 forms a two-dimensional concave surface or shape.

A two-dimensional concave surface has a curvature only in one direction. This curvature of the two-dimensional concave surface in one direction results for instance because fold heights 113 of adjacent filter folds 103 continuously decrease or continuously increase so that the fold edges 108 have a variable distance from the opposing surface, i.e. the inflow surface 109 or the outflow surface 110. The fold height 113 is preferably up to 40 cm. A width of the filter medium 102 is preferably up to 68 cm. The fold height 113 is defined as a distance from the envelope ends 111 to a fold edge 108. The fold height 113 runs toward the envelope ends 111, 112 in the direction needed either continuously decreasing or continuously increasing.

Naturally, however, adjacent filter folds 103 may also have the same filter height 113. The envelope end 112 at the outflow surface 110 is formed in that the fold edges 108 of any filter fold 103 have a different distance, i.e., a different fold height 113, to the inflow surface 109. The envelope end 112 and the fold edges 108 thus form a two-dimensionally curved concave surface, since the two-dimensional concave surface is curved towards the envelope ends 112, but does not have any curvature towards the course of the fold edges 108.

In the filter folds 103, glue fillets 114 extend in a direction from the inflow surface 109 to the outflow surface 110 and provide increased stability for the bellows 101. Using the glue fillets 114, the folded sections 104, 105 of the filter folds 103 are positioned relative to one another and the fold edges 108 are held at a defined fold interval 120 from one another. The fold interval 120 is defined as the horizontal distance, in the orientation in FIG. 2, between two fold edges 108. The glue fillets 114 are preferably tapered. The glue fillets 114 are especially an adhesive 114 applied to the filter medium 102. The adhesive 114 is in particular impermeable to fluid. The adhesive 114 is preferably a hot-melt adhesive or hot glue.

In other embodiments, however, the envelope ends 112 may also be configured such that the fold height 113 of adjacent filter folds 103 first decreases and then increases again. In general the envelope end 112 may have a desired course and thus may be embodied such that the inflow surface 109 or the outflow surface 109 of the filter element 100 corresponds to or is adapted to the external characteristics through the design of an air filter or air filter housing.

As may be seen from the depiction in FIG. 2, the raw fluid RO flows in the inflow direction 106 towards the inflow surface 109, then penetrates into the filter folds 103, divides along an air flow direction 115 such that the fluid on the inflow side penetrates through the first folded section 104 and the second folded section 105 of any filter fold 103, thus being filtered, so that the filtered fluid RE emerges from the filter element 100 in the outflow direction 107 from the outflow surface 110, wherein the fluid on the outflow side of the filter element 100 is called clean fluid RE.

Figure 3:
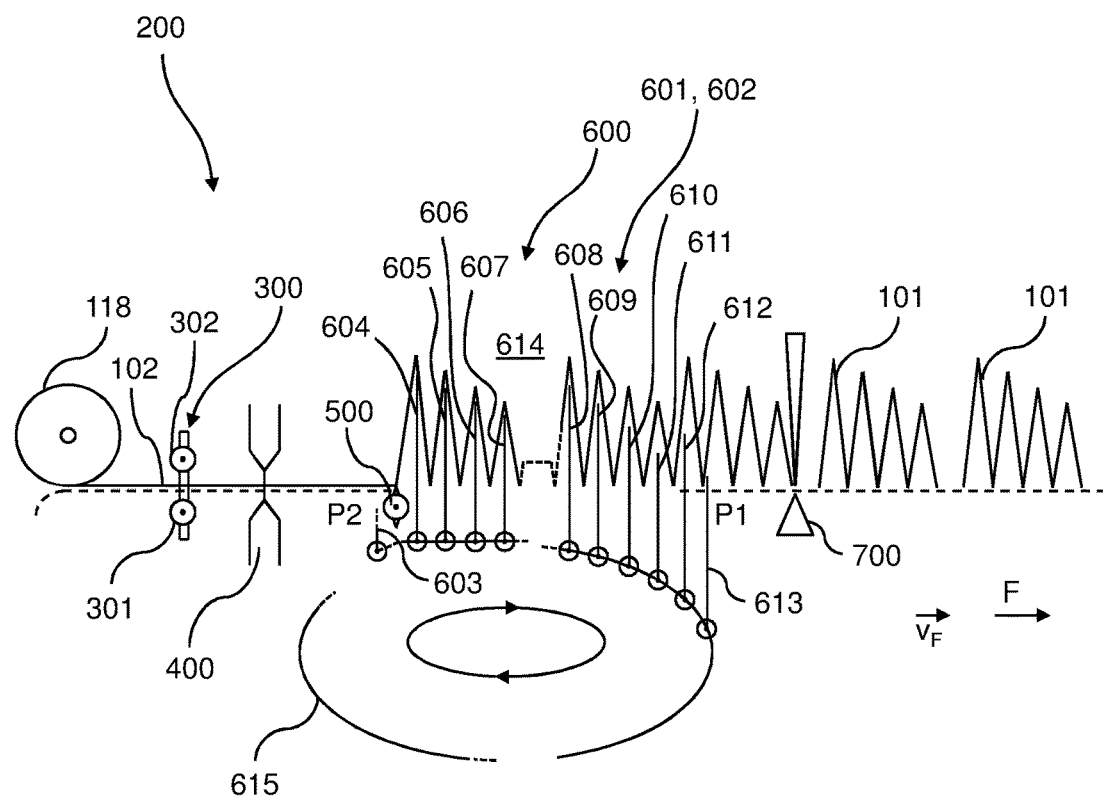
FIG. 3 is a schematic side view of an embodiment of a device for producing a bellows.
Figure 4:
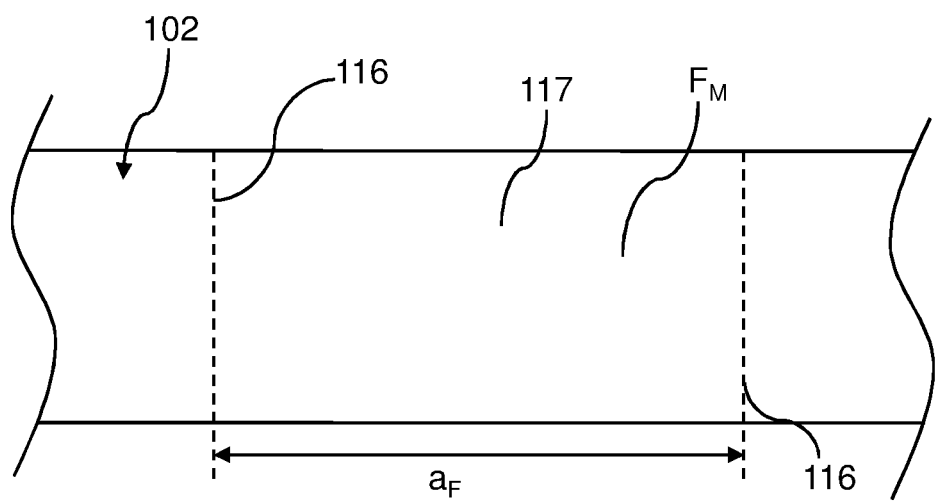
FIG. 4 is a schematic top view of a filter medium.
Figure 5A:
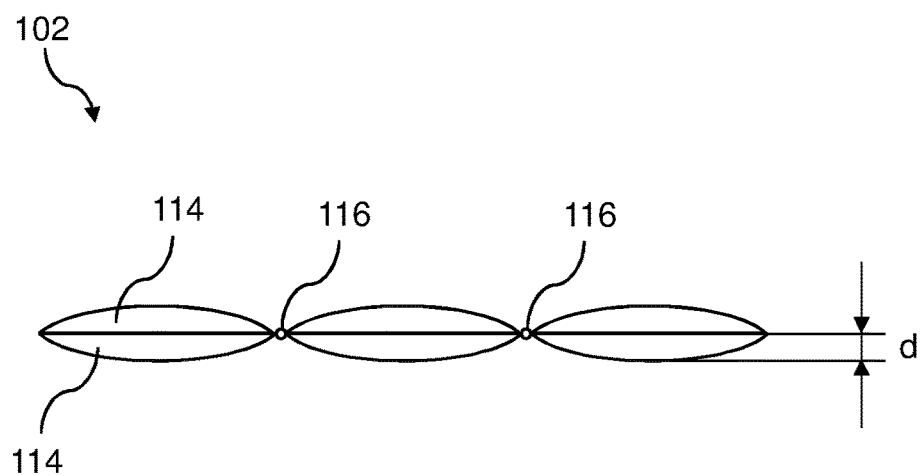
FIG. 5A-5C are schematic side views of the filter medium.
Figure 5B:
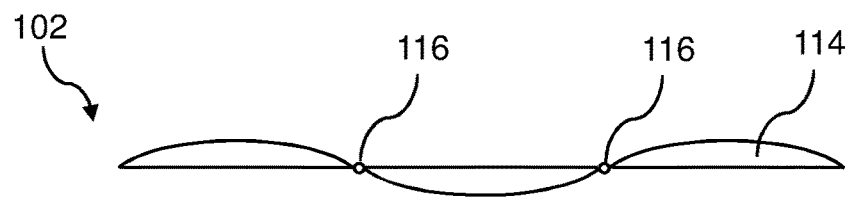
Figure 5C:
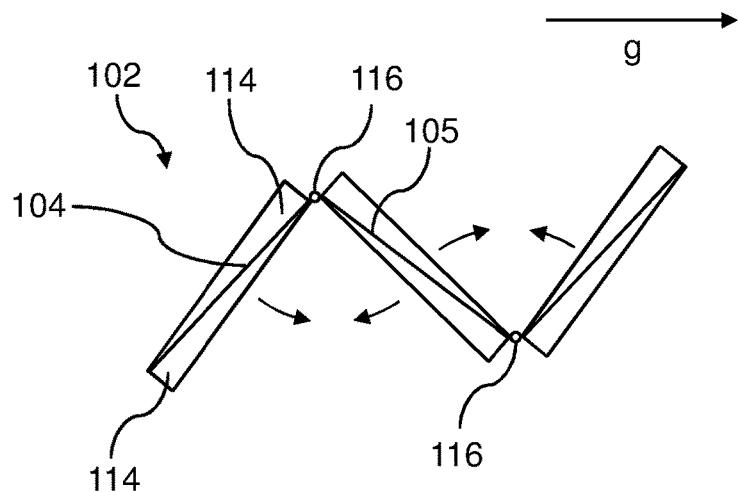

FIG. 3 is a schematic side view of a device 200 for producing the bellows 101. FIG. 4 is a schematic top view of the linear filter medium 102. FIGS. 5A through 5C depict the embossed filter medium 102 with applied adhesive 114. The following references FIGS. 3 through 5 simultaneously.

The device 200 has an embossing device 300 for embossing fold lines 116, illustrated in FIG. 4, of the filter medium 102. One folded section 117 of the filter medium 102 is delimited by two adjacent fold lines 116. The embossing device 300 is designed to provide a desired fold line interval $a_F$, wherein the fold line interval $a_F$ determines the fold height 113 of the bellows 101. The fold line interval $a_F$ may furthermore be adjusted in that a conveyance speed $v_F$ of the filter medium 102 is varied.

The embossing device 300 preferably has two opposing embossing shafts 301, 302. FIG. 3 illustrates a direction of conveyance F for the filter medium 102. Each embossing shaft 301, 302 may have a relief, for instance in the form of a plurality of blades or embossing edges. The fold line interval $a_F$ may be adjusted as desired by varying the rotational speed of the embossing shafts 301, 302. The rotational speed of the embossing shafts 301, 302 may be adjusted using a drive device for the embossing device 300. The drive device may be an electric motor. The fold line interval $a_F$ may furthermore be adjusted in that the conveyance speed $v_F$ of the filter medium 102 is varied.

The device 200 furthermore has an adhesive application device 400 downstream of the embossing device 300 in the direction of conveyance F of the filter medium 102. The adhesive application device 400 is designed to apply adhesive 114 to the embossed filter medium 102. The adhesive 114 may be a glue. The adhesive application device 400 is designed in particular for applying adhesive 114 to both sides of the embossed filter medium 102 at the same time. The adhesive 114 may be applied, for instance, in dots or linearly. The adhesive application device 400 is designed in particular to apply the adhesive 114 to the filter medium 102 in a tapered shape. The adhesive 114 is in particular extruded and applied to the filter medium 102 using adhesive nozzles.

The adhesive application device 400 has in particular a plurality of mutually opposing adhesive nozzles. As is illustrated in FIG. 5A, in a tapered shape shall be construed to mean that a thickness d of the adhesive 114 decreases towards any fold edge 116. The thickness d of the adhesive 114 in particular decreases towards an inner fold edge 116. In addition, as illustrated in FIG. 5B, the adhesive 114 may be applied alternatingly on each side to adjacent folded sections 117 of the filter medium 102. FIG. 5C illustrates the folding of the filter medium 102 provided with adhesive 114. The quantity of the adhesive 114 extruded from the adhesive nozzles may involve the use of a control device for the device 200.

Furthermore, the device 200 may include a positioning device 500 for positioning the folded sections 104, 105 to form the filter folds 103. The positioning device 500 may have two positioning rollers arranged downstream of the adhesive application device 400 in direction of conveyance F of the filter medium 102. The embossed filter medium 102 that has been provided with adhesive 114 runs against the positioning rollers, so that the filter medium 102 is folded at the fold edges 116. The positioning device 500 is optional.

The device 200 furthermore includes a folding device 600 for folding the finished filter medium 102. The folding device 600 may have the positioning device 500 that is provided for forming the filter folds 103. The folding device 600 has at least one die packet or supporting element packet 601, 602. The supporting element packet 601, 602 has a plurality of adjacent dies or supporting elements 603-613. There may be any desired number of supporting elements 603-613. For instance, the supporting element packet 601, 602 may include 70 supporting elements 603-613. The supporting elements 603-613 of the supporting element packet 601, 602 may optionally be moved vertically into and out of a folding space 614 of the folding device 600. The supporting elements 603-613 are pivotably mounted on transport carts that themselves are attached to a revolving conveyor belt 615. A connecting rod (not shown) inserts the supporting elements 603-613 into the folded slots 119.

Each supporting element 603-613 may be moved into the folding space 614 until a folded section 117 of the filter medium 102 can be supported by that supporting element 603-613. The folding device 600 is designed to move the supporting elements 603-613 in the direction of conveyance F of the filter medium 102 along with the folded filter medium 102, to move them out thereof at a first position P1 of the folding space 614 in opposition to the direction of conveyance F of the filter medium 102, to move them to a second position P2 of the folding space 614, and to move them into it again. The supporting elements 603-613 have different heights and projection different distances into the folding space 614 depending on the fold line interval $a_F$ that is set.

Figure 6:
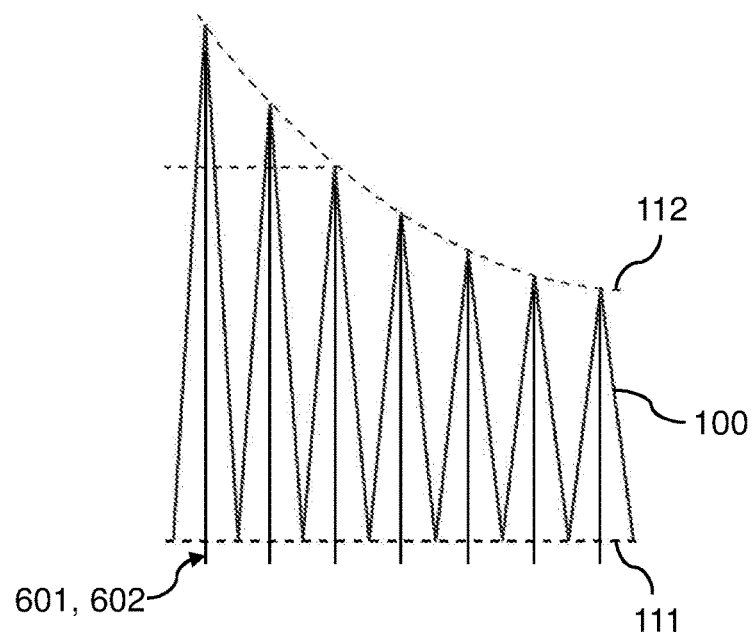
FIG. 6 is a schematic side view of one embodiment of a folding device of the device in accordance with FIG. 3.

FIG. 6 illustrates that the supporting elements 603-613 of the folding device 600 in accordance with FIG. 3 are moved into the folding space 614 corresponding to the desired variable fold height 113 such that the filter folds 103 are supported across their entire fold height 113.

Figure 7:
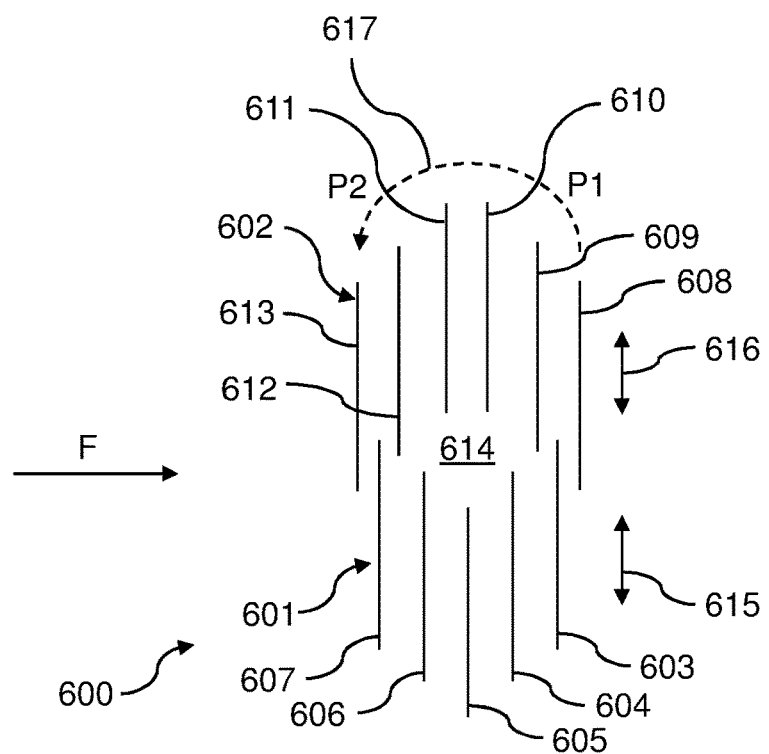
FIG. 7 is a schematic side view of a modified embodiment of a folding device of the device in accordance with FIG. 3.

FIG. 7 is a schematic side view of another embodiment of a folding device 600 in a modified structural form. The folding device has two supporting element packets 601, 602 arranged opposing one another. The supporting elements 603-607 are allocated to the supporting element packet 601 and the supporting elements 608-613 are allocated to the supporting element packet 602. The supporting elements 603-613 may be moved alternatingly into and out of the folding space 614.

Figure 8:
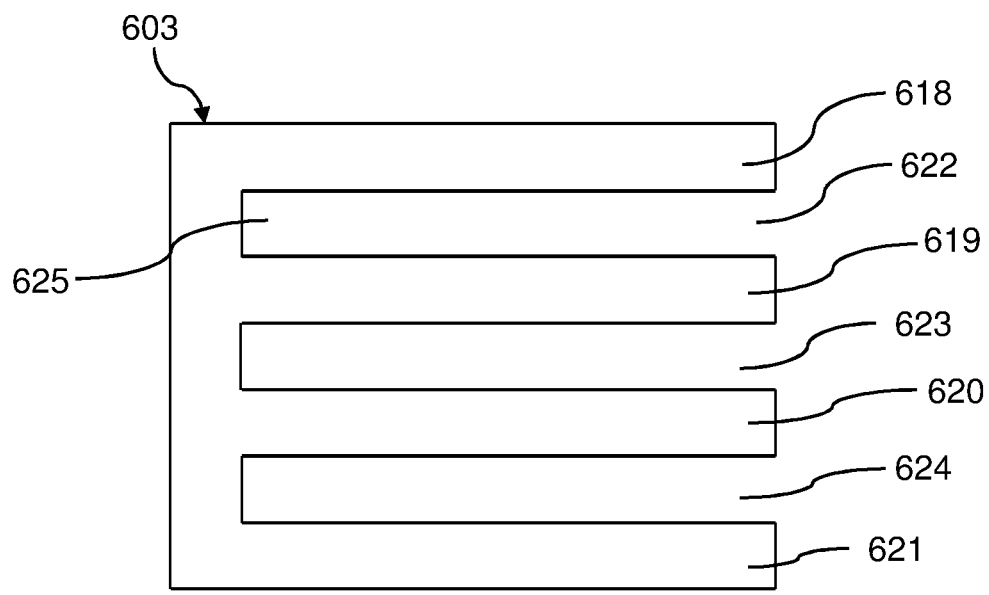
FIG. 8 is a schematic view of an embodiment of a supporting element of the folding device in accordance with FIG. 3.
Figure 9:
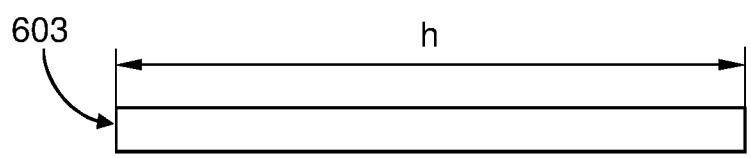
FIG. 9 is a schematic side view of the supporting element in accordance with FIG. 8.
Figure 10:
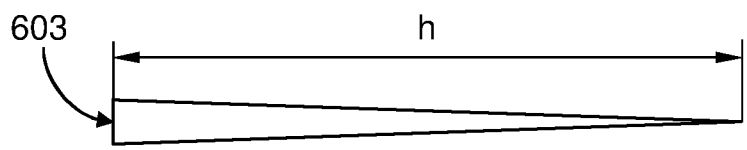
FIG. 10 is a schematic side view of a modified version of the supporting element in accordance with FIG. 8; and, FIG. 11 is a schematic side view of a second embodiment of a device for producing a bellows.

The supporting elements 603-613 are preferably embodied tapered in shape, especially like dies. FIG. 8 is a schematic top view of the supporting element 603. FIG. 9 is a schematic side view of the supporting element 603. FIG. 10 is a schematic side view of a refinement of the supporting element 603.

As FIG. 8 illustrates, the supporting element 603 has in particular a comb-like structure. Recesses 622-624 for the glue fillets 114 are provided between teeth 618-621 of the supporting element 603. This prevents the adhesive 114 from adhering to the supporting element 603. The teeth 618-621 may be rounded. The recesses 622-624 are preferably embodied such that when a supporting element 603 is inserted completely into a folded slot 119 of the folded filter medium 102, the respective end segment 625 is exposed. The glue fillets 114 are in particular strips of hot glue.

FIG. 9 illustrates an embodiment of the supporting element 603 having a rectangular cross-section. The supporting element 603 has a height or depth h. The height h may correspond to the fold height 113. The supporting elements 603-613 may each have different heights h.

FIG. 10 illustrates another embodiment of the supporting element 603 having a tapered cross-section. The cross-section of the supporting element 603 tapers towards a fold edge 108 of the folded filter medium 102. The geometry of the supporting element 603 preferably corresponds to a geometry of the filter folds 103 of the folded filter medium 102. The supporting element 603 may be produced for instance from a steel material or a carbon fiber-reinforced plastic material.

The device 200 furthermore includes a separating device 700, illustrated in FIG. 3, which is downstream of the folding device 600. The separating device 700 is designed to separate the finished bellows 101 from the filter medium 102. The separating device 700 may be a saw, a blade, or a laser system for separating the bellows from the filter medium 102. The entire volume of the bellows 100 may be cut with the laser system.

The filter medium 102 is preferably supplied to the device 200 via a feed device. The feed device may have an element on which the filter medium 102 is mounted in roll form 118.

Figure 11:
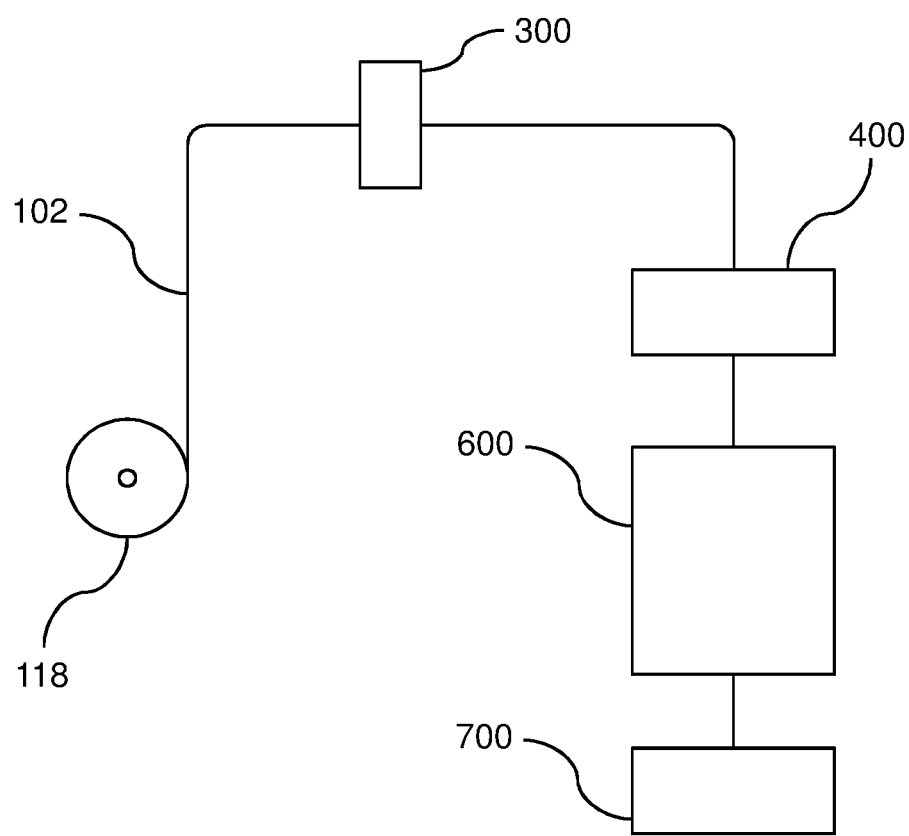

FIG. 11 illustrates an alternative structural form for the device 200 for producing a bellows 101. Essentially, the embossing device 300, the adhesive application device 400, the folding device 600, and the separating device 700 are embodied corresponding to the device 200 in accordance with FIG. 3 or the variants described in the foregoing. The device 200 is distinguished therefrom merely in that the filter medium 102 runs vertically, instead of horizontally, in the adhesive application device 400, folding device 600, and separating device 700. However, variants are also possible in which the filter medium 102 runs on an incline, at least in part.

What is claimed is:

1. A device for producing a bellows from a filter medium, comprising:
   an embossing device embossing fold lines into a flat filter medium that runs through the embossing device, producing an embossed flat unfolded filter medium having embossed fold lines for later folding into a folded filter medium;
   wherein the embossed fold lines delimit the flat unfolded filter medium into a plurality of connected adjacent unfolded filter medium sections, the adjacent unfolded filter medium sections joined together at the embossed fold line, the unfolded filter medium sections each being delimited by two adjacent embossed fold lines;
   an adhesive application device positioned in a direction of conveyance of the filter medium after the embossing device, the adhesive application device applying adhesive onto the unfolded filter medium sections of the flat embossed filter medium; and
   a folding device positioned in a direction of conveyance of the filter medium after the adhesive application device, the folding device folding on the embossed fold lines, in a zig-zag manner, the flat embossed filter medium onto which the adhesive was applied into the folded filter medium;
   wherein the folding device includes
      a plurality of spaced apart adjacent supporting elements that are arranged on a conveying device to travel in the direction of conveyance of the filter medium with the filter medium, the adjacent supporting elements spaced apart to be received against and deflect embossed fold lines of unfolded filter medium, forming immediately adjacent folds in the filter medium, the adjacent supporting elements spaced apart at a distance corresponding to spacing between immediately adjacent folds of the filter medium;
   wherein the plurality of adjacent supporting elements, moving in the direction of conveyance of the filter medium, are moved automatically into or out of a folding space of the folding device;
   wherein the adjacent supporting elements are designed such, and are movable into the folding space such, that adjacent folded sections of the folded filter medium are each contacted and supported by a respective one of the plurality of adjacent supporting elements, and
   wherein the folding device is designed such as to move the adjacent supporting elements that have been moved into the folding space in a direction of conveyance of the filter medium along with the folded filter medium.

2. The device according to claim 1, wherein
the adjacent folded sections of the folded filter medium are each supported by a respective one of the plurality of spaced apart adjacent supporting elements until the adhesive is dimensionally stable.

3. The device according to claim 1, wherein
the conveying device of the folding device moves the plurality of spaced apart adjacent supporting elements in the direction of conveyance of the filter medium in synchronization with movement of the folded filter medium,
to move the plurality of spaced apart adjacent supporting elements out of the folding space at a first or lower position of the folding space;
to move the plurality of spaced apart adjacent supporting elements opposing the direction of conveyance of the filter medium into a second or upper position of the folding space, and
to move the plurality of spaced apart adjacent supporting elements back into this folding space such that any folded section of the folded filter medium is always supported across its entire length.

4. The device according to claim 1, wherein
individual ones of the plurality of spaced apart adjacent supporting elements have different heights, the different heights forming a filter bellows having folds with different heights; and
wherein a height of individual ones of the spaced apart adjacent supporting elements corresponds to a height of a respective formed folded slots of the folded filter medium.

5. The device according to claim 1, wherein
the individual ones of the plurality of spaced apart adjacent supporting elements are movable a different distance into or out of the folding space, producing a bellows having folds of different heights.

6. The device according to claim 1, wherein
the adhesive application device is designed to apply tapered beads of adhesive onto the filter medium and/or to apply adhesive to both sides of the filter medium, and/or to apply adhesive to both sides of the filter medium simultaneously.

7. The device according to claim 1, wherein
the plurality of spaced apart adjacent supporting elements have recesses for holding adhesive applied to the filter medium.

8. The device according to claim 1, wherein
the plurality of spaced apart adjacent supporting elements have a tapered outer contour.

9. The device according to claim 1, wherein
the plurality of spaced apart adjacent supporting elements are arranged opposing one another; and
wherein the plurality of spaced apart adjacent supporting elements are alternatingly movable into and out of the folding space of the folding device.

10. A method for producing a bellows from a filter medium using the device according to claim 1, comprising the following steps:
embossing fold lines into the filter medium forming an embossed filter medium;
wherein one folded section of the embossed filter medium is delimited by two adjacent fold lines;
applying adhesive onto the embossed filter medium; and
folding, in a zig-zag manner, the embossed filter medium that has been provided with adhesive;
wherein folded sections, after the folding of the filter medium, are supported across their entire length by supporting elements arranged in formed folded slots of the filter medium and moved in a direction of conveyance of the filter medium along with the folded filter medium.

11. The method according to claim 10, wherein
after the step of folding in a zig-zag manner, the folded sections are supported by the supporting elements projecting different distances into the folding space.

12. The method according to claim 10, further comprising the step of
varying a conveyance speed of the filter medium such that during production of a bellows having different fold heights, the number of folds produced per unit of time is constant for the bellows.

13. The method according to claim 10, wherein
the supporting elements remain in the folded slots of the filter medium until the adhesive is dimensionally stable.

14. The method according to claim 10, wherein
the adhesive is applied such that a thickness of the adhesive varies perpendicular to the fold lines.

15. The method according to claim 10, wherein
the adhesive is applied in beads and/or on both sides of the filter medium.

* * * * *